United States Patent [19]

Hillman et al.

[11] 4,455,180

[45] Jun. 19, 1984

[54] METHOD OF FABRICATING A SINTERED AND SELECTIVELY PLUGGED HONEYCOMB STRUCTURE

[75] Inventors: Arthur E. Hillman, Campbell; Robert J. Paisley, Corning, both of N.Y.

[73] Assignee: Corning Glass Works, Corning, N.Y.

[21] Appl. No.: 295,612

[22] Filed: Aug. 24, 1981

[51] Int. Cl.³ .................. C03B 29/00; C04B 35/64; B01D 39/20

[52] U.S. Cl. .................. 156/89; 156/293; 55/523; 55/DIG. 5; 55/DIG. 30; 422/180; 428/117; 264/60; 264/63

[58] Field of Search .......... 55/523, DIG. 5, DIG. 30; 210/510; 422/180; 501/112, 119; 252/477 R; 60/311; 428/116, 117; 264/60, 63; 156/89, 252, 253, 278, 280, 293, 294, 303

[56] References Cited

U.S. PATENT DOCUMENTS

| | | | |
|---|---|---|---|
| 2,960,747 | 11/1960 | Dungan | 264/63 |
| 3,979,216 | 9/1976 | Fritsch, Jr. et al. | 501/119 |
| 4,193,857 | 3/1980 | Bannister et al. | 264/63 |
| 4,225,354 | 9/1980 | Rao | 501/112 |
| 4,276,071 | 6/1981 | Outland | 55/523 |
| 4,279,849 | 7/1981 | Ogawa et al. | 264/63 |
| 4,292,083 | 9/1981 | Rauch, Sr. | 501/119 |
| 4,293,357 | 10/1981 | Higuchi et al. | 55/523 |
| 4,300,953 | 11/1981 | Lachman | 501/112 |
| 4,306,909 | 12/1981 | Oda et al. | 501/112 |
| 4,307,198 | 12/1981 | Oda et al. | 252/477 R |
| 4,316,965 | 2/1982 | Oda et al. | 252/477 R |
| 4,327,188 | 4/1982 | End et al. | 252/477 R |
| 4,329,162 | 5/1982 | Pitcher, Jr. | 55/523 |
| 4,364,760 | 12/1982 | Higuchi et al. | 55/523 |

FOREIGN PATENT DOCUMENTS 637261 12/1978 U.S.S.R. .................. 264/60

*Primary Examiner*—David L. Lacey
*Attorney, Agent, or Firm*—R. N. Wardell

[57] ABSTRACT

A sintered, honeycomb structure having plugged cell ends is formed in a single sintering step by plugging the cell ends of a sinterable honeycomb structure with an appropriate material which, when heated to the sintering temperature of the structure and compared with any dimensional changes the structure undergoes during its sintering, provides a relative expansion of the plugs with respect to the structure of between about 1.5% and 7% and, preferably, between about 2 and 4%. Various exemplary batch mixtures are identified for fabricating solid particulate filter bodies from extruded ceramic substrates in which both the substrate and plugs sinter to primarily cordierite crystal phases at temperatures between about 1340° C. and 1450° C.

11 Claims, 2 Drawing Figures

METHOD OF FABRICATING A SINTERED AND SELECTIVELY PLUGGED HONEYCOMB STRUCTURE

BACKGROUND OF THE INVENTION

This invention relates to selectively plugged sinterable honeycomb structures and in particular, to a method and compositions for fabricating such structures.

A need for the present invention has arisen in the fabrication of solid particulate filter bodies from sinterable ceramic substrates. Filter bodies of the type being referred to are described and claimed in a pending application Ser. No. 165,646, entitled FILTER AND RELATED APPARATUS, filed July 3, 1980, which is assigned to the assignee of this application and is hereby incorporated by reference. Basically, the filter body is formed by providing a honeycomb structure having hollow open ended passages or cells extending between a pair of its opposing outer end faces. The cells are formed by thin, porous intersecting walls which also extend across and between the end faces. A subset of alternate cells are manifolded (i.e. plugged) or otherwise sealed in a checkered pattern at one of the end faces while the remaining alternate cells are sealed in a reversed checkered pattern at the remaining end face of the structure. A contaminated fluid, such as diesel engine exhaust gas, introduced under pressure to either of the end faces is forced into the cells open at that end face and through the thin, porous walls between those cells and the adjoining cells which open only at the remaining end face. The exhaust gas exits the filter body through these latter cells. Solid contaminants too large to pass through the open porosity of the thin walls are left behind in the filter body. The ceramic filter bodies are generally useful for moderately high temperature applications (up to at least 1000° C.) and have been preferably formed from monolithically extruded and sintered honeycomb ceramic substrates having cordierite as their primary crystal phase as are described and claimed in U.S. Pat. Nos. 3,895,977 and 4,001,028 which exhibit particularly low coefficients of thermal expansion ($15 \times 10^{-6}$/°C. or less over the range 25° to 1000° C.). Foam-type ceramic cements, also having cordierite as their primary crystal phase, have been used to plug the cell ends of the substrates in fabricating the diesel particulate and other types of filter bodies and are described and claimed in another pending application Ser. No. 165,647 filed July 3, 1980 and entitled FOAM CERAMIC CEMENT originally issued as U.S. Pat. No. 4,297,140 and reissued as U.S. Pat. No. Re. 31,405, which is assigned to the assignee of this application and is incorporated by reference herein. These foam-type cements are used by first providing a sintered, cordierite honeycomb substrate, charging a formable batch of the cement into selected cell ends by conventional means, drying the cement plugs thus formed and then firing the substrate to sinter the cement. The foam-type cements contain an additive or additives, silicon carbide in the above-identified cordierite yielding cement, which react and generate gases at about the sintering temperature of the cement mixture. The released gases cause the remaining plug mixture components, which by this time have melted into a liquid or semi-liquid state, to foam and expand significantly in volume thereby filling all gaps between the plug and the surrounding thin walls forming the cells.

There are certain disadvantages in using the foam-type cordierite ceramic cements. For example, it would be desirable to form the filter body or other selectively plugged honeycomb structure in a single sintering step so as to minimize the time and energy required to fabricate the final structure. Use of the foam-type cements require two separate firing and cooling cycles: a first cycle to sinter the substrate and a second cycle after charging the selected cell ends to foam and sinter the cement. Also, it would be desirable to plug the substrates before their sintering as they typically experience some shrinkage during this step which increases the difficulty of subsequently charging a plugging material into their cell ends. Lastly, it would be desirable to plug the substrates with a material which could withstand the sintering temperature of the substrate as this would raise the maximum use temperature of the resultant plugged body. The range of firing temperatures of the foam-type cordierite cements are approximately several hundred degrees less than the sintering temperature of the preferred cordierite substrate material (e.g. approximately 1200° C. versus 1400° C., respectively). Use of the filter body above the lower firing temperature (approximately 1200° C.) will have a deleterious effect on the foam-type cement plugs and could cause the loss of the cell end seal.

Although non-foaming ceramic compositions (i.e. cements) have been used in formable batch mixtures to bond together sections of green (i.e. dried but not sintered) ceramic honeycomb substrates, the cement and substrate sections all being sintered to primarily cordierite crystal phases during one firing operation, attempts to fabricate solid particulate filter bodies by charging a non-foaming ceramic material batch mixture into the cells of a green substrate extruded from the same or other ceramic batch mixtures were not successful as large numbers of cracks and voids would typically appear in the plugs and between the plugs and cell walls in the final sintered product. The foam-type cements have been heretofore preferred in fabricating these filter bodies as their foaming action has counteracted these problems.

Filter bodies might be fabricated by inserting solid, preformed green plugs into selected cell ends of a green honeycomb substrate and firing the plugs and substrate together in a manner similar to that described in U.S. Pat. No. 3,564,328, but that approach is undesirable for fabricating filter bodies. Because literally thousand of cells, must be plugged in fabricating the described filter bodies, it is easier to form the plugs using liquid or plastically formable plugging material which are introduced in bulk into many or all of the cell ends than to register and insert preformed plugs into the very small cell ends. Furthermore, the uncontrolled shrinkage difference taught by U.S. Pat. No. 3,564,328 results in imprecise outer dimensioning of the filter body and may cause fracturing of the thin porous walls forming the honeycomb matrix.

SUMMARY OF THE INVENTION

It is an object of the invention to provide solid particulate filter bodies and other selectively plugged, sintered honeycomb structures by plugging green (i.e. dried but not sintered) honeycomb structures which are subsequently fired to affect their sintering.

According to the invention, this and other objects are accomplished by plugging selected cell ends of a green, honeycomb structure with a material which has or undergoes relative linear expansion in relation to the honeycomb structure when both are initially heated to a temperature at which the structure substantially achieves its desired sintering thereby causing the plugging material to fill and block the cell ends. This may be accomplished by using with a honeycomb structure which shrinks when sintered, a plugging material which does not shrink so much or even expands slightly, or by using with a honeycomb structure which does not change dimensionally or expands only slightly when sintered, a plugging material which undergoes a greater expansion. The linear dimensional change undergone by the materials forming either the plugs or the honeycomb substrate, between the time the plugged material is introduced into the substrate cell ends and the time the substrate and plugs have been heated to the highest temperature at which the substrate is sintered, is referred to as the net expansion/shrinkage of the material and typically includes the combined (i.e. net) effect of dimensional changes from drying and sintering, if either or both are appropriate. In particular, it has been found that the amount of this relative linear expansion of the plugging material in relation to the honeycomb structure (i.e. the positive mathematical difference of the net expansion (positive) or shrinkage (negative) of the plugging material minus the expansion (positive) or shrinkage (negative) of the substrate material) should be greater than about 1.5% to avoid the formation of cracks and voids in the plugs and separation between the plugs and cell walls in the sintered product, no greater than about 4.5% to prevent mushrooming of the plugged honeycomb structure end faces and/or possible fracture of the thin walls forming the cells and preferably between about 2.0 and 4.0%. This amount of relative linear expansion (or shrinkage) of the plugging material in relation to the honeycomb structure between the time the plugging material is introduced into the structures cell ends and the time the structure and plugging material are heated to the highest temperature at which the substrate is sintered shall also be referred to as the plug/substrate net expansion (or shrinkage). Particular plugging and honeycomb substrate batch mixture combinations, are also identified which yielded a plug/substrate relative linear expansion of between about 4.5% and 7.0% resulting in mushrooming of the end faces without fracture of the thin walls of the honeycomb substrate.

It is yet another object of the invention to provide batch material compositions for fabricating a selectively plugged honeycomb structure comprised primarily of sintered material.

It is yet another object of the invention to provide a sintered, plugged honeycomb structure requiring but a single sintering step in its fabrication.

It is yet another object of the invention to provide compositions for selectively plugged ceramic honeycomb structures in which both the structure and plugs have cordierite as their primary crystal phase.

It is yet another object of the invention to provide a selectively plugged honeycomb structure and a method for fabricating the same having a useful service temperature of 1300° C. or more.

According to another important aspect of the invention, these and other objects are accomplished by utilizing for plugging, selected materials which undergo dimensional changes due to chemical reactions when heated to the sintering temperature of the honeycomb structure, such as other sinterable ceramic batch mixtures. Such plugging material mixtures typically include a dissolving vehicle so that the mixture may be charged in a liquid or plastically formable state into the cell ends. The charged mixture would experience some shrinkage by evaporation of the vehicle during drying. However, the batch mixtures may be selected to yield an appropriate expansion or contraction during sintering which, when combined with the drying shrinkage of the plugging material and the sintering shrinkage (or expansion) of the honeycomb substrate, yields the desired relative expansion of the plugging material to the substrate.

Several exemplary combinations of substrate and plugging batch mixtures are identified which may be formed by conventional methods into sintered, selectively plugged honeycomb structures in a single sintering step. The identified substrate mixtures react and sinter into a primarily cordierite crystal phase when heated to temperatures between about 1340° C. and 1450° C. The identified exemplary substrate mixtures comprise raw ceramic materials with or without graphite plus plasticizing and binding agents. The relative proportions of the ceramic raw materials to graphite in the substrate batch mixtures range between approximately 100% to 77% ceramic raw material with 0% to 23% graphite. The identified exemplary plugging mixtures also comprise ceramic raw materials, with or without a combustible agent such as graphite, which is consumed prior to sintering and before the plugging batch mixture ingredients have melted, plus plasticizing and binding agents. The relative proportions, by weight of the raw ceramic materials and graphite in the identified plugging batch mixtures range from between about 100% to 83.3% ceramic raw materials with about 0% to 16.7% graphite, although it is envisioned even greater proportions of graphite may be successfully used. The identified plugging batch mixtures also sinter into predominantly cordierite crystal phases when heated to temperatures between about 1340° C. and 1450° C. In specific examples, selectively plugged honeycomb structures were fabricated by heating samples of certain of the identified substrate and plugging mixture combinations to about 1425° C. to rapidly affect their reaction and sintering. The resulting structures were useful up to their melting temperatures of about 1460° C., well above the approximately 1200° C. use temperature of the prior foam-type cement plugged cordierite structures.

DETAILED DESCRIPTION OF THE INVENTION

Figure 1:
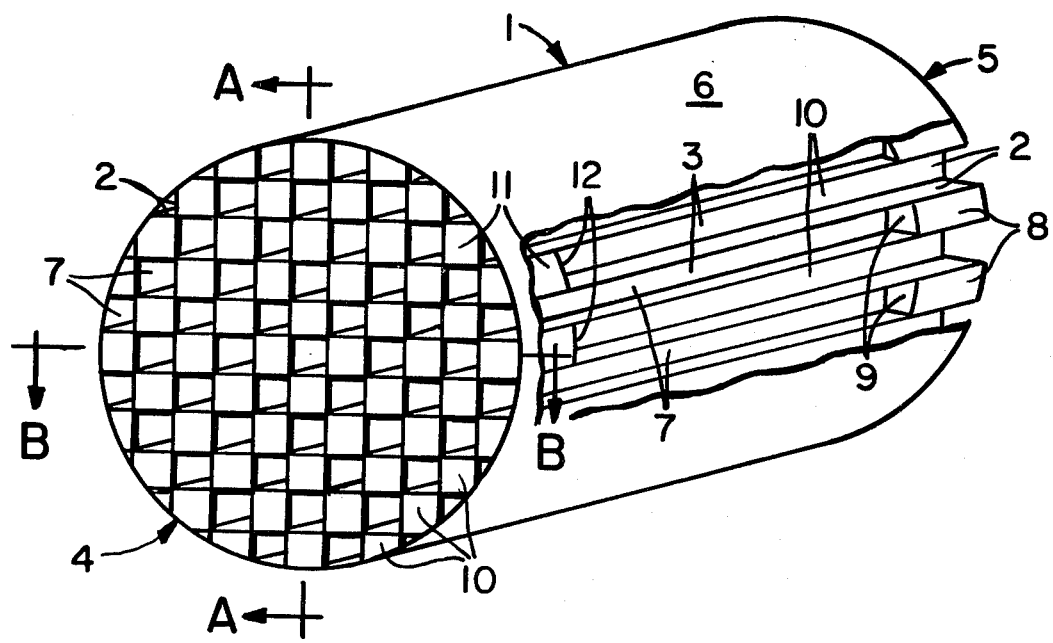
FIG. 1 is a partially broken away, oblique view of a preferred embodiment according to the present invention in the form of a filter body.

The filter body 1 shown in FIG. 1 comprises a cellular or honeycomb structure (monolith) which has a matrix of intersecting, uniformly thin walls 2 defining a multiplicity of cells 3. The cells 3 extend longitudinally and mutually parallel through the body 1 between the inlet end face 4 and the outlet end face 5. Ordinarily the body 1 also has a peripheral wall or skin 6. An inlet group or plurality of alternate cells 7 are open at the inlet end face 4, but their initially open, opposite ends are closed, sealed or plugged with plugs 8 adjacent outlet end face 5. Plugs 8 are formed of a plugging material as herein described so as to adhere to walls 2 and to extend from face 5 a short distance inwardly to end faces 9 of plugs 8. The other alternate cells 10 form an outlet group or plurality of cells which are open at outlet end face 5, but their initially open, opposite ends are similarly closed adjacent inlet end face 4 by plugs 11, which likewise extend inwardly a short distance from face 4 to end face 12 of plugs 11. Thus, as viewed at end faces 4 and 5, the alternating open and closed plurality of cells are in a checkered or checkerboard pattern. In the case of this preferred embodiment filter, body 1, including plugs 8 and 11, can be made of any suitable materials in accordance with the present invention such that walls 2 have the requisite interconnected open porosity therein and plugs 8, 11 are generally impermeable to fluids.

Figure 2:
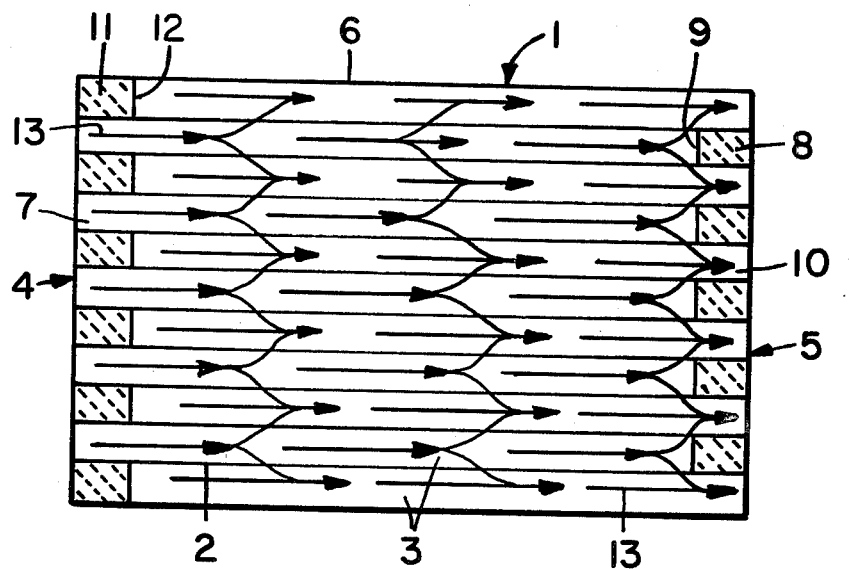
FIG. 2 is a sectional view taken in each plane indicated by each of the line and arrows A—A and the line and arrows B—B of FIG. 1.

FIG. 2 shows the pattern of fluid flow through filter 1 in both a vertical column of cells 3 (in plane A—A of FIG. 1) and a horizontal column of cells 3 (in plane B—B of FIG. 1). Fluid flow is indicated by the lines 13 with arrows. Thus, fluid 13 passes into inlet cells 7 from inlet end face 4, but because of the blocking effect of end faces 9 of plugs 8, the fluid under some pressure then passes through the pores or open porosity in cell walls 2 at top, bottom and both sides of the cells 7 so as to respectively enter outlet cells 10 above, below and on both sides of each cell 7. While fluid 13 passes through the entirety of all cell walls 2, their porosity is such as to restrain particulates therein and thereon as a porous accumulation (which may even fill up all of cells 7 before replacement or regeneration of the filter 1). The fluid 13 passing into cells 10 then flows out of these cells at the outlet end face 5, since the end faces 12 of plugs 11 adjacent the inlet end face 4 prevents fluid 13 from reversing direction. Also, plugs 11 prevent fluid 13 from directly entering cells 10 without first going into cells 7 and through walls 2.

Table I lists the ingredients of six non-foaming plugging mixtures which were used to fabricate sample diesel exhaust solid particulate filter bodies. Also listed in Table I are the qualitative observations of the viscosity of the mixtures and their net expansion or shrinkage. As used herein, net expansion or shrinkage means the mathematical sum of positive expansion values and negative shrinkage values for expansion and/or shrinkage occurring during drying and sintering of the mixtures. A positive sum value is a net expansion and a negative sum value is a net shrinkage.

Batches of sample plugging mixtures were prepared using the ingredients listed in Table I. The dry ingredients of each of the sample plugging mixtures (clay, talc, alumina, graphite and methyl cellulose) were first thoroughly blended. In small batches, a ball mill mixer operating for 8 to 12 hours was satisfactory. Larger batches were mixed in a high speed, high shear Littleford mixer for approximately 5 minutes. The methyl cellulose is a plasticizing and binding agent and a Methocel 4000-MC TM product manufactured by Dow Chemical was used. Distilled water in the indicated proportions was then added to the dry ingredients as a plasticizing agent and dissolving vehicle. The water and dry components were further mixed into a paste of uniform composition and consistency.

Several green (i.e. dried but not sintered) honeycomb substrates were provided in the manner described in pending application Ser. No. 165,646 in the compositions of Samples D-E-F-G-H (hereinafter the Sample 1 substrates) and Samples L-M (hereinafter the Sample 2 substrates) of TABLE I of that application. The substrate samples had cylindrical geometries with circular end faces either approximately 3.66 inches (about 8 cm.) or 5.66 inches (about 13 cm) in diameter and were formed with thin walls approximately 0.017 inches (about 0.4 mm.) thick defining substantially square cells at a density of about 100 cells/in.$^2$ (approximately 15.5 cells/cm.$^2$). Again, the sample substrates were formed by extruding each of the sinterable mixtures in the manner disclosed in U.S. Pat. Nos. 3,790,654, 3,919,384 and 4,008,033.

Various filter bodies were fabricated by charging each of the six blended plugging mixtures of Table I into Sample 1 substrates of both 3.66 and 5.66 inch end face diameters. In addition, the Sample 2 plugging material was charged into Sample 2 substrates of both 3.66 and 5.66 inch end face diameters. Alternate cells at each end face of each sample substrate were charged to depths of at least ¼ and preferably, about ½ inch (approximately 6.2 and 12.7 mm. respectively) in a checkered or checkerboard pattern reversed at either end face of the structure, as is described and claimed in the aforesaid application Ser. No. 165,646. The alternate cells were plugged by covering each end face of the sample substrate with a transparent Mylar TM tape and melting holes through the tape opposite the cell ends to be charged in the manner described and claimed in a co-pending application Ser. No. 283,732 filed July 15, 1981, which is assigned to the assignee of this application and incorporated by reference herein. The plugging mixtures were charged into the tape covered cell ends using a hand operated press apparatus also described in that application. Other conventional methods which may be used to charge the formable plug mixtures into selected cell ends to fabricate the filter bodies or other selectively plugged honeycomb structures are described and claimed in pending applications Ser. Nos. 283,733, 283,734 (now U.S. Pat. No. 4,411,856) and 283,735 filed July 15, 1981 and Ser. Nos. 295,610 and 295,611 filed Aug. 24, 1981, assigned to the assignee of this application and incorporated by reference herein. After charging, the plugged substrates were dried overnight at room temperature. Each of the six plugging mixtures typically experienced a drying shrinkage of about 2 to 2.5% from their original charging dimensions. In their formation, the substrate samples also experienced drying shrinkages of about 2 to 2.5% from their original, extrusion die dimensions. The honeycomb structure batch compositions of the application Ser. No. 165,646 react and sinter into primarily cordierite crystal phases when heated to temperatures of between about 1340° C. and 1450° C. for sufficiently long periods of time. After drying, each of the plugged substrates was fired according to the following schedule to sinter it and its plugs:

80° C. to 1425° C. within about 60 hours (about 32° C./hr.-average);

Hold at 1425° C. about 10 hours;

Cool from 1425° C. to room temperature within about 24 hours (about 58° C./hr.-average).

The indicated heat soak at 1425° C. assured substantial sintering throughout the plugs and substrates and the formation of a primarily cordierite crystal structure in and between the substrates and plugs.

TABLE I

| Batch Ingredients*: | Sample Plugging Mixtures | | | | | |
|---|---|---|---|---|---|---|
| | 1 | 2 | 3 | 4 | 5 | 6 |
| Kaopaque 10 Clay (APS 10)** | 13.81 | 9.51 | — | 9.82 | 9.35 | 11.56 |
| Pfizer MP 96-28 Montana Talc (APS-20) | 33.25 | 34.31 | 36.25 | 35.45 | 33.77 | 13.25 |
| Alcoa A-2 Alumina ($Al_2O_3$) (APS-5.8) | 12.54 | 18.66 | 28.71 | 24.56 | 15.85 | 13.50 |
| Reynolds RH-730 Alumina ($Al_2O_3$) (APS 1.4) | 13.91 | 7.78 | — | — | 11.49 | 13.25 |
| Penn Glass Sand Corp. Supersil Fused Silica (−200 mesh) | 10.55 | 13.07 | 18.37 | 13.50 | 12.87 | 11.64 |
| Asbury 4012 Graphite*** | 16.67 | 16.67 | 16.67 | 16.67 | 16.67 | 16.67 |
| Dow Methocel 4000-MC ™ methyl cellulose | 2.0 | 2.0 | 2.0 | 2.0 | 2.0 | 2.0 |
| Distilled Water | 35–37% | 35–40% | 35–37% | 35–37% | 35–37% | 35–37% |
| Viscosity | stiff | good | soft | stiff | stiff | stiff |
| Net expansion (+) or shrinkage (−) | −1.5 to −2.0% | +1% | +3 to +4% | +2% | 0 | −1% |

*Batch Ingredients - weight % of total ceramic and graphite raw material.
**APS is average particle size in micrometers.
***Particle size (wt. %): 1.4% + 120 mesh; 21.1% - 120 + 140 mesh; 63.9% - 140 + 200 mesh; and 13.6% - 200 mesh (All U.S. Std. Sieve).

As is indicated in Table I, the six sample plugging materials experienced net dimensional changes (i.e. from both drying and sintering) ranging from a shrinkage of about 1.5 to 2.0% (plugging Sample 1) to an expansion of about 3 to 4% (plugging Sample 3). As each sample plugging mixture experienced an approximately 2 to 2.5% drying shrinkage, it can be seen that each also experienced a subsequent expansion during sintering. As is also indicated in Table I, the plugging materials varied in consistency from a "stiff", modeling claylike state, which was at times difficult to force into the cell ends in uniform or sufficient depths, to a "soft" state that was very easily worked into the cell ends. The Sample 2 plugging material had a viscosity between "stiff" and "soft" and provided the most uniform filling of the sample substrates to the desired depths with the aforesaid hand-operated press.

The Sample 2 plugging material was deemed the best overall with the Sample 1 and 2 substrates. The batch material packed well into the cell ends without difficulty and dried without the formation of voids or cracks within the plugs or cracks between the plugs and the cell walls in both Sample 1 and 2 substrates at both end face diameters. The Sample 2 plugging material after firing formed well shaped, solid plugs sealing the cell ends with no apparent distortion or defects. As each of the Sample 1 and Sample 2 substrates experienced between about 2 and 2.5% drying shrinkage and net (i.e. drying plus sintering) shrinkages of approximately 4% for the Sample 2 substrates and 5% for the Sample 1 substrates, the firing shrinkages experienced by the Sample 1 and Sample 2 substrates ranged from approximately 1.5% to 3%. The Sample 2 plugging material was found to have a net expansion of about 1% (i.e. a drying shrinkage followed by a greater sintering expansion), yielding a relative expansion of the Sample 2 plugging material in relation to the Sample 1 and Sample 2 substrates (i.e. plug/substrate relative expansion) of between approximately 2.5% and 4%.

The Sample 5 plugging material charged into the Sample 1 substrates was also deemed to have yielded acceptable solid particulate filter bodies. The Sample 5 plugs were well formed without voids or cracks, did not separate from the cell walls, and did not exhibit any expansion distortion of the substrate after sintering. The Samples 5 plugging material, which experienced no net dimensional change (i.e. a drying shrinkage followed by an equal sintering expansion) when combined with the Sample 1 substrate (sintering shrinkage of 2.5% to 3%), yielded a plug/substrate relative expansion of between approximately 2.5 and 3%. This expansion difference is well within the range found acceptable with the Sample 2 plugging material and Sample 1 and 2 substrate combinations.

The combination of Sample 6 plugging mixture with the Sample 1 substrates was also deemed acceptable. Again, the plugs were well formed without voids, cracks or separation from the cell walls and with no visible expansion distortion of the substrate end face after sintering. The Sample 6 plugging material having a net shrinkage of about 1% combined with the 2.5 to 3% sintering shrinkage of the Sample 1 substrate, to yield a plug/substrate relative expansion of between about 1.5% and 2.0%. The success of this combination indicates that the Sample 5 plugging material and Sample 2 substrate would also provide an acceptable combination as those materials would also yield a plug/substrate relative expansion of between about 1.5% and 2.0%. However, the plug/substrate relative expansion difference of between about 0.5 and 1.0% which results from the Sample 6 plugging material and Sample 2 substrate combination is not believed to be acceptable. This is based upon the observations of the Sample 1 plugging material and Sample 1 substrate combinations in which pinholes remained in a small number (less than 5%) of the plugs after sintering. The Sample 1 plugging material having a net shrinkage of between about 1.5 and 2% (i.e. drying shrinkage plus sintering expansion) combined with the 2.5 to 3% sintering shrinkage of the Sample 1 substrate to yield a plug/substrate relative expansion difference of only about 0.5% to 1.5%. The Sample 1 plugging material and Sample 2 substrate combination is viewed as being even less suitable as the relative linear expansion of the plug material in relation to the substrate ranges from about 0.5% to −0.5% (i.e. from a plug/substrate relative expansion to a plug/substrate relative shrinkage difference).

The Sample 3 plugging material-Sample 1 substrate and Sample 4 plugging material-Sample 1 substrate combinations were also deemed undesirable as expansion of the plugs in these samples caused visible mushrooming (i.e. expansion) of the end faces of the substrates. The Sample 4 plugging material had a net expansion of about 2% which yielded with the Sample 1 substrate, a plug/substrate relative expansion of between approximately 4.5% and 5.0%. It is envisioned, however, that the Sample 4 plug material may successfully be used with the Sample 2 substrate as that combination yields a plug/substrate relative expansion of between about 3.5% and 4.0%. The Sample 3 plugging material had a net expansion of between 3% and 4% which yielded with the Sample 1 substrate, a plug/substrate relative expansion between about 5.5% to 7%. Due to the mushrooming of the end faces it was not possible to test the characteristics of the Sample 3 and 4 plugging material filter bodies. The plugs did however appear to seal the cell ends without fracturing the thin walls and the combinations may be used in applications where distortion of the substrate end face is inconsequential or where a small number of widely scattered cells would be plugged. It should be appreciated that with other plugging and substrate material combinations, excessive expansion of the plugs may also cause fracturing of the thin walls of the substrate.

It is desirable to minimize the drying shrinkage of the batch plugging mixtures so as to avoid the formation of drying cracks and voids. The 2% Methocel 4000-MC ™ product with 35 to 40% distilled water appeared to be an optimum combination of those agents with the six plugging material compositions of Table I to minimize drying shrinkage while still yielding a plugging material having a workable viscosity. In other experiments, it had been found that a combination of approximately 4% Methocel 4000-MC ™ product with between approximately 40 and 60% water when added to 100% raw ceramic materials or raw ceramic materials with graphite, caused excessive drying shrinkage to occur with center voids and cracks forming in the plugs and between plugs and cell walls during drying. Drying center voids were also formed using combinations of 1% Methocel 4000-MC ™ product and 50% water added to a mix of 100% by weight ceramic raw materials. Mixed results were observed using the combination of 1% Methocel 4000-MC ™ product and approximately 40% water added to 100% raw ceramic material mixtures. The Methocel 4000-MC ™ product proved to be a barely sufficient binder under these circumstances, as center voids were observed to be formed during drying in a small number of the plugs of some of the samples. Small voids and cracks formed in the plugs or between the plugs and the substrate during drying are not necessarily a problem if the plugging material has a sufficient (but not excessive) relative expansion in relation to the substrate as the resulting compression of the plugs during sintering will often cause these defects to be eliminated. It is envisioned that plasticizing and binding agents other than water and methyl cellulose such as water with polyethylene glycol and polyvinyl alcohol may also be used to form workable plugging mixtures. The amounts of the particular agents used should be selected so as to provide sufficient workability and binding of the plugging mixture materials during and after drying and to minimize their drying shrinkage. It will further be appreciated by those skilled in the art that particle compacting may be increased and drying shrinkage minimized by preparing mixtures containing a distribution of particle sizes, as are present in the sample plugging mixtures of Table I, rather than particles of the same uniform size.

Graphite was selected to modify the dimensional variation of the sample plugging mixtures and acted to lessen the shrinkage or increase the expansion undergone by the ceramic raw materials of each of the six plugging mixture combinations when reacting and crystallizing during sintering so as to obtain an appropriate range of expanding (and shrinking) plugging materials to test with the Sample 1 and Sample 2 substrates. Without the graphite, the indicated combinations of the ceramic raw materials experienced total dimensional changes of between about 2.5% expansion and 3.6% shrinkage. The graphite, which is consumed through combustion before the plugs have begun to sinter or to melt or appreciably soften, leaves voids and causes the resulting sintered plugs to be relatively more porous and softer during firing than plugs formed from a similar mixture of ceramic materials without the graphite and thus, more likely to deform during sintering to conform to the inner contours of the cells. Graphite was also found not to deleteriously affect the coefficient of thermal expansion (CTE) of the plug mixtures. The Sample 1 and 2 substrates had CTE's of about $12 \times 10^{-6}/°C$. or less over the range 25° to 1000° C. Although the CTE's of the six plugging material mixtures of Table I were not measured, the successful firing of various filter body samples would indicate that the thermal expansion coefficients of each plugging mixture varied less than about 10 parts per million (ppm) and was probably closer to about 5 ppm from that of the substrates with which they were used over the sintering firing ranges (about room temperature to 1425° C.). Prior experiments in attempting to plug cordierite honeycomb substrates comparable to the Sample 1 and 2 substrates with plugging mixtures which sintered into cordierite crystal phase and included, in their batch form, various amounts of powdered cordierite grog (i.e. a sintered as opposed to raw or unsintered but calcined ceramic material, in this case having cordierite as its primry crystal phase) were unsuccessful in that crystalline plugs formed had higher thermal expansion coefficients than the cordierite honeycomb substrates and after sintering and cooling were found to have caused fracturing of the thin wall material around the unplugged cells. It is estimated that the six plugging material mixtures of Table I have CTE's of about 12 to $14 \times 10^{-6}/°C$. over the range 25° to 1000° C., as compared to about 17 to $18 \times 10^{-6}/°C$. over the same range for the foam-type cordierite cements described in the application Ser. No. 165,647 and so may be more easily used with honeycomb structures having lower CTE's than can the foam-type cordierite cements. It will be apparent to one skilled in the art that other percentages of graphite may be used with the six plugging material combinations of Table I to yield differing net expansions (or shrinkages) and that various percentages of graphite may be used with other mixtures of raw ceramic materials to yield other sinterable plugging mixtures having cordierite or other crystalline forms as a primary crystal phase. It will also be apparent to one skilled in the art that other consumable materials such as flour, sawdust or the like may be used to vary the net shrinkge or expansion of various ceramic raw material mixtures, although it will also be appreciated that impurities in such materials may deleteriously effect the coefficient of thermal expansion of the resulting sintered product. Moreover care should be exercised in selecting a combustable material for use in a plugging mixture to avoid forming plugs having such extensive interconnected open, porosity as to permit the passage of solid particulates or undesirably large solid particulates through or around the plugs.

The Sample 2, 5 and 6 plugging material and Sample 1 substrate combinations were tested as diesel exhaust filters in the manner described in the aforesaid application Ser. No. 165,646 and were found to be at least as durable and efficient as the filters formed with the foam-type cordierite cement described in that application.

Selectively plugged cordierite honeycomb structures may be formed from other raw ceramic material compositions. For example, the four other substrate batch compositions of TABLE I of application Ser. No. 165,646 yield drying shrinkages of between approximately 2 and 2.5% and the following approximate net (i.e. drying plus sintering) shrinkages: Samples A (6%); Samples B-C (5.5%); Samples I-J-K (3%); and Samples N (6%). Other plugging material mixtures may also be derived by eliminating the graphite from the six sample plugging mixtures of Table I, above, and increasing their raw ceramic material by the same proportional amount (i.e. by 20%) to yield a 100.0% by weight mixture of only ceramic raw materials, such as clay, talc, alumina, and silica. Modified in this manner, each of the six original plugging samples of Table I yields a drying shrinkage of between 2.0 and 2.5% and the net (i.e. drying plus sintering) expansion or shrinkage indicated in Table II.

TABLE II

| PLUGGING SAMPLES | NET EXPANSION (+) OR SHRINKAGE (−) |
|---|---|
| 7. (Modified Plugging Sample 1) | −3.6 |
| 8. (Modified Plugging Sample 2) | +0.7 |
| 9. (Modified Plugging Sample 3) | +2.5 |
| 10. (Modified Plugging Sample 4) | +1.3 |
| 11. (Modified Plugging Sample 5) | −1.1 |
| 12. (Modified Plugging Sample 6) | −2.1 |

It is envisioned that several other combinations of the original six plugging material mixtures of Table I, above, and of the other four substrate samples identified in TABLE I of application Ser. No. 165,646 (i.e. Samples A, Samples B-C, Samples I-J-K, and Samples N) will yield acceptable plug/substrate relative expansions as will combinations of the six modified plugging mixtures (plugging Samples 7 through 12 of Table II) with the six sample substrate compositions of TABLE I of application Ser. No. 165,646. Again, plug/substrate relative expansions of less than 1.5% (including all plug/substrate relative shrinkages) are undesired as they are expected to leave voids and/or cracks in the plugs and/or separations of plugs from the cell walls which may not be eliminated during sintering; between 1.5 and 2% are considered marginal with the slight possibility of voids or cracks remaining after sintering; 2.0 to 4.0% are preferred; 4.0 to 4.5% may be considered marginal due to the onset of mushrooming of the substrate end face; and greater than 4.5% may be considered undesirable due to noticable mushrooming of the substrate end faces and the possible fracture of their thin walls.

While it is possible to form usable plugged substrates by firing to a temperature where the substrates are substantially sintered and the plugging material is not substantially sintered, but is sufficiently rigidified, such plugged substrates are generally not preferred nor as durable as those in which the plugging material is also substantially sintered. Moreover, plugging material need not be sinterable material but can be a hardenable or settable material, even one in which no true drying occurs in a "drying" or curing step, which is inorganic and/or organic, is highly heat resistant to deformation at sintering temperatures of the substrates and exhibits the necessary relative expansion in relation to the substrate.

All referred to dimensional changes (expansions and shrinkages) are linear and are preferably ascertained by forming the batch mixtures (plugging and substrate) into comparable honeycomb structures and by measuring the open end faces after drying and firing to the sintering temperature of the substrate batch being considered. Throughout this specification, references to batch mixture material percentages are always on the weight basis unless otherwise specifically specified. Furthermore, although the invention has been described in terms of various preferred and other exemplary embodiments, the scope of the invention is more fully set forth in the following claims.

What is claimed is:

1. A method of fabricating a sintered and selectively plugged honeycomb structure comprising the steps of:
   providing a green honeycomb structure having a multiplicity of hollow, open-ended cells extending therethrough and formed of a first sinterable material;
   providing plugs in at least one open end portion of a plurality of said multiplicity of cells, the plugs being formed of a second material which undergoes, with respect to the honeycomb structure as a result of drying and sintering the plugged honeycomb structure, a relative linear expansion sufficiently great to fill and block the cell ends and sufficiently small to prevent fracturing of the cells; and
   substantially sintering said plugged structure whereby said plugs fill and block said end portions of said plurality of cells.

2. The method of claim 1 wherein said step of providing plugs further comprises forming and drying plugs in the end portions of said plurality of cells with a formable plugging material.

3. The method of claim 2 wherein said step of forming further comprises charging said formable plugging material under pressure into said end portions of said plurality of cells.

4. The method of claim 1 wherein said relative linear expansion is at least about 1.5% during said drying and sintering steps.

5. The method of claim 4 wherein said relative linear expansion is also no more than about 4.5% with respect to said honeycomb structure.

6. The method of claim 1 wherein said relative expansion is at least 2.0% during said drying and sintering steps.

7. The method of claim 6 wherein said relative linear expansion is also no more than about 4% with respect to said honeycomb structure.

8. The method of claim 1 wherein said step of substantially sintering said structure also substantially sinters said plugs.

9. The method of claim 8 wherein said step of substantially sintering comprises heating said structure and plugs to a temperature greater than about 1250° C.

10. The method of claim 9 wherein said substantially sintering step comprises heating said structure and said plugs to a temperature between about 1340° C. and 1450° C.

11. The method of claim 8 wherein the first and second materials during the step of sintering form primarily cordierite crystal phase.

* * * * *